United States Patent [19]
Rittler

[11] Patent Number: 5,547,720
[45] Date of Patent: Aug. 20, 1996

[54] TRANSPARENT, PROTECTIVE GLAZING UNIT

[75] Inventor: Hermann L. Rittler, Corning, N.Y.

[73] Assignee: Corning Incorporated, Corning, N.Y.

[21] Appl. No.: 310,277

[22] Filed: Sep. 21, 1994

[51] Int. Cl.⁶ .................................................. E06B 3/24
[52] U.S. Cl. .......................... 428/34; 428/913; 52/786.1
[58] Field of Search ........................... 428/34, 76, 432, 428/689, 913; 52/786.1

[56] References Cited

U.S. PATENT DOCUMENTS

| | | | |
|---|---|---|---|
| 3,974,316 | 8/1976 | Jacquemin et al. | 428/215 |
| 3,997,700 | 12/1976 | Jacquemin et al. | 428/332 |
| 4,071,649 | 1/1978 | Jacquemin et al. | 428/215 |
| 5,124,208 | 6/1992 | Bolton et al. | 428/412 |
| 5,135,788 | 8/1992 | Nolte | 428/34 |
| 5,217,764 | 6/1993 | Eich | 428/34 |
| 5,223,313 | 6/1993 | Holzer et al. | 428/34 |
| 5,244,709 | 9/1993 | Vanderstukken | 428/34 |

FOREIGN PATENT DOCUMENTS

| | | |
|---|---|---|
| 4236936A1 | 5/1994 | Germany . |
| 4307631A1 | 9/1994 | Germany . |

*Primary Examiner*—Donald Loney
*Attorney, Agent, or Firm*—Milton M. Peterson

[57] ABSTRACT

A multi-panel glazing unit comprising a transparent, fluid sol and at least two transparent sheets of glazing material spaced apart to enclose the fluid sol, the sol wetting the inner surfaces of the glazing sheets and being thermally convertible to a cellular, non-flammable, inorganic material that adheres to the inner surfaces of the glazing sheets and that insulates against heat transfer. In an embodiment, the sol comprises a polar solvent, an aluminum compound, and a compound reactive with the aluminum compound under thermal influence to form an aluminous crystalline material.

19 Claims, 1 Drawing Sheet

5,547,720

TRANSPARENT, PROTECTIVE GLAZING UNIT

FIELD OF THE INVENTION

A multi-panel glazing unit comprising spaced glazing sheets that enclose a thermally foamable material.

BACKGROUND OF THE INVENTION

Various multi-panel glazing units are known. One such unit is composed of two pressed, hollow, glass bodies. The open faces of the two bodies are sealed together to form a unit for a glass wall. Another well-known example is the automotive windshield wherein two glass sheets are joined with an adhesive polymer interlayer. A further example is a double pane window wherein an intervening space is evacuated to prevent heat transfer.

The present invention is primarily concerned with a further type of multi-panel glazing unit. This unit is commonly referred to as a fire window. Such a glazing is mounted in a fire wall, or door. It is designed to provide transparency, while protecting against rapid spreading of flames in case of fire. Ordinary, single-pane glazing units tend to shatter in a fire, thus enabling flames to spread rapidly. Organic materials tend to be flammable, as well as creating noxious fumes.

It has been proposed to employ a construction similar to the multi-pane automotive safety glass. In this construction, the glass will still shatter, but the interlayer will tend to hold the broken glass in place. However, the interlayer is an organic material which will rapidly disintegrate itself.

Another proposed construction embodies spaced panes sealed together with a spacer. The intermediate space may be either evacuated, or filled with a liquid. This construction also fails to adequately fulfill the requirements of a fire window.

It is a purpose of the present invention to provide a multi-panel glazing unit with an enclosed material that produces an effective fire window. The enclosed material, to be effective, must meet these requirements:

1. It must be transparent.
2. It must be capable of producing a foam under thermal influence.
3. The foam produced must function as an insulator, that is, must resist the transfer of heat.
4. The material must adhere to the glass both prior to and after foaming.
5. The material should not shrink, crack, or discolor over a period of time.

Fire window materials, heretofore available, have satisfied one or more of these requirements, but not all. The insulating and glass adherence requirements have been especially difficult to meet. Prior structures, when exposed to flame, have tended to either fracture and disintegrate, or to rapidly transfer heat between panes.

The present invention provides a fluid sol for enclosure between spaced glass panes to produce a fire window. The fluid sol is transparent, ages well, and foams when exposed to heat. The foam produced adheres to the glass, acts as an insulator, resists deterioration, and is non-toxic.

SUMMARY OF THE INVENTION

The invention resides in a multi-panel glazing unit comprising a transparent fluid sol and at least two transparent sheets of glazing material spaced apart to enclose the fluid sol, the sol wetting the inner surfaces of the glazing sheets and being thermally convertible to a cellular, non-flammable, inorganic material that adheres to the inner surfaces of the glazing sheets and that insulates against heat transfer.

PRIOR ART

Patent literature of possible interest is described in an accompanying document.

DESCRIPTION OF THE INVENTION

Figure 1:
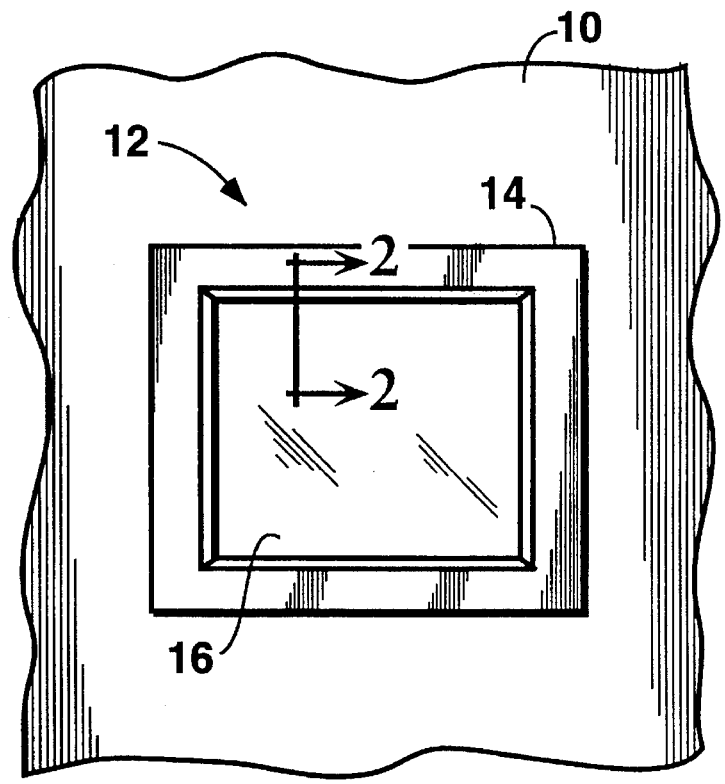
FIG. 1 is a partial elevational view showing a window in accordance with the invention installed in a fire wall.

The present invention is predicated on findings relative to fluid sols, and their use in fire windows and like glazing. In particular, I have found that certain transparent sols provide a very effective fire window when introduced between two spaced panes of glass and contained therebetween. The sols are essentially composed of a polar solvent, an aluminum compound soluble in the solvent and a second compound that is reactive with the aluminum compound under thermal influence to form an aluminous crystalline material. Optionally, other soluble inorganics and organics that do not produce toxic fumes may be included in the fluid sol.

Any polar solvent may be employed. Water is generally employed, except where another polar solvent may be necessary. For example, an acidified solution may be required where an otherwise difficultly soluble additive is involved. In some cases, it is desirable to use a zwitter ion in the solvent to buffer the sol. For example, this may be glycine where aluminum chloride ($AlCl_3$) is employed.

The source of aluminum may be any aluminum compound, such as the chloride. However, I prefer to employ aluminum chlorohydrate because it is commercially available, easy to handle, and non-toxic.

The second compound must also be soluble in the solvent to produce a transparent mixture. It may be any soluble inorganic compound that thermally reacts with the aluminum compound under the influence of heat to produce a crystalline aluminous material. The second compound may be any acid, base, metal halide, metal carbonate, metal nitrate, or metal sulfate that meets the foregoing requirements.

I prefer to employ a soluble phosphorus compound, preferably a phosphate, as the second reactive compound. Commercial phosphoric acid (85% by weight) is a preferred source of phosphate because of its ready availability in quantity. However, other soluble phosphates, such as ammonium phosphate, are also contemplated. The reaction of the aluminum and the phosphorus compounds, when heat is applied, forms a crystalline aluminum phosphate.

To impart specific characteristics or properties, a variety of soluble metal compounds may be added in minor amounts usually no more than about 20% and preferably no more than 10%. For example, soluble boron and lithium compounds may be included to facilitate adhesion of the foam to the glass panes when the assembly is exposed to heat.

The boron compounds include boric acid and metal borates, such as sodium borate and lithium pentaborate. Other lithium compounds include the citrate, nitrate and chromate. Soluble iron compounds that have been used include the sulfate, lactate and malate.

Liquid sols containing minor additives produce secondary crystal phases when exposed to heat. These secondary crystal phases may, for example, be: $BPO_4$, $Al_5(BO_3)O_6$, $Al_4B_2O_9$, $Al_6Si_2O_{13}$, $Na_2Al_2B_2O_7$, $Na_2Al_2B_4O_{10}$, $KB_3O_5$, $Ca_2B_2P_2O_{10}$, $Ca_2BO_3Cl$, $Cu_2Al_6B_4O_{17}$, $Cu_2AlBO_5$, $LiMnBO_3$, $LiMgBO_3$, $Li_2Al_2B_2O_7$, $LiAlO_2$, $Mn_3(BO_3)_2$, $MgAl_2O_4$ and $Ca_2Al_2O_6$.

Usually, the fluid sol will be colorless to permit normal vision. On occasion, however, it may be desirable to impart color to the sol. In that event, minor amounts of known inorganic colorants and/or organic dyes, that are soluble and transparent, may be incorporated in such amounts as necessary to impart the desired color.

Addition of other non-toxic organic materials is also contemplated. Such materials include urea, melamines, acrylics and gums which do not render the sol opaque. These organic additives tend to increase the viscosity of the sol. This, in turn, increases the amount of both impact energy and thermal energy that the window can absorb before fracturing and losing fluid.

FIG. 1 of the accompanying drawings, is a partial elevational view of a structural wall 10. Wall 10 has a window 12 that is constructed in accordance with the invention. Window 12 comprises two glass panes 16 mounted in a frame 14.

Figure 2:
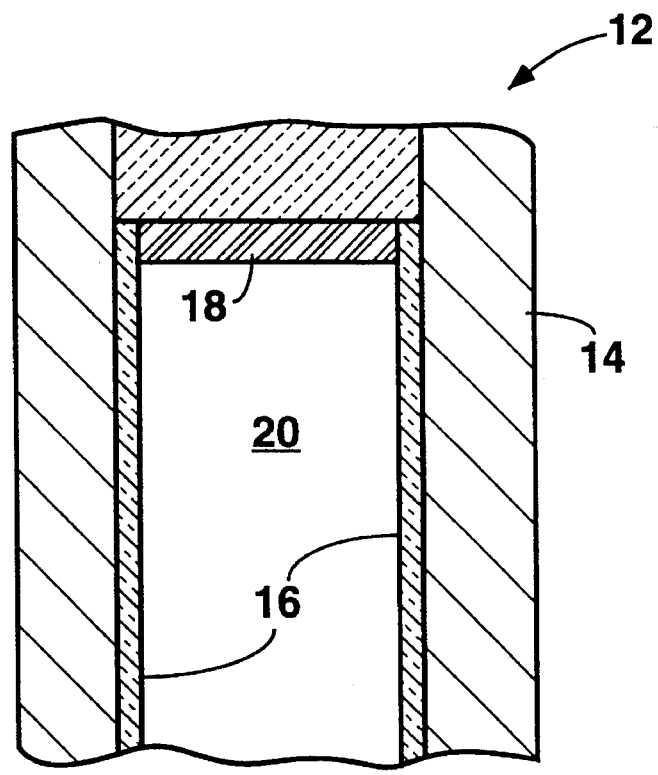
FIG. 2 is a cross-sectional view taken along line 2—2 of FIG. 1 further illustrating the invention.

FIG. 2 is a cross-section view taken along line 2—2 in FIG. 1. It illustrates the structural features of a preferred embodiment of window 12. Glass panes 16 of window 12 are held in spaced relationship by a member 18. Member 18 may be a sealing strip that is intermediate the edge portions of the panes 16 and is adhered to both panes. Alternatively, window 12 may be fitted into a channel (not shown) in frame 14.

In the preferred embodiment, sealing strip 18 extends about the entire periphery of the window assembly. As such, it defines a closed cavity 20 between panes 16.

A transparent sol is introduced into, and contained in, cavity 20. If desired, sealing strip 18 may be provided with perforations or vents. These permit the escape of steam or other gas generated when the assembly is exposed to flame.

Panes 16 may be any known glazing material, such as conventional window panes of soda lime glass. Where greater resistance to thermal shock is desired, panes 16 may be formed from special glasses, such as low expansion borosilicates. Also, the use of transparent glass-ceramic sheets is contemplated.

In practicing the invention, the transparent sol is prepared by mixing its various components in predetermined proportions. Panes 16 are sealed together in spaced relation as shown in FIG. 2. The sealing means may be a hermetic seal. This avoids drying and cracking of the sol on aging; also, leakage during handling and storing of the window. In the event that the seal is vented, or otherwise left open to air, suitable organics may be included in the sol to avoid its deterioration on aging.

The sol may be introduced between panes 16 by any known means. Thus, it may be pumped in through an injection means. Alternatively, a pouring spout may be employed with the sol being poured into the spout. In general, it is desirable to completely fill cavity 20 with sol while avoiding bubbles or trapped air.

Window assembly 12 is then mounted in wall 10 as shown in FIG. 1. Thereafter, it remains in situ until such time as a fire occasions its utility. When this occurs, the sol undergoes transformation to produce crystalline aluminous materials in porous form. The formation of these crystalline phases is accompanied by the evolution of the solvent, thus causing foam formation. To avoid undue pressure developing when the window is exposed to heat, vents may be provided in sealing strip 18 as noted earlier. These vents may be provided with a relief plug, or other means that opens with pressure. This expedient insures that window 20 remains intact, and in place, until such time as it actually disintegrates when exposed to flame.

It is a particular feature of the present invention that bonding of the sol material to the glass may be maintained at all times. Thus, in the unheated ,state, organic additives may be provided to cause adherence of the sol to the surface of the glass pane. At intermediate temperatures, reactive additives, such as lithium chloride and/or boric acid, may be provided to facilitate bonding to the glass. Once the sol has been fully foamed at elevated temperatures, the aluminous crystalline material, for example, aluminum phosphate, adheres firmly to the glass surface. This insures that the window remains in place even when fracture of the glass occurs.

Another feature of the invention is the heat insulating effect of the crystalline material formed when the sol is foamed. For example, even though the glass pane on the flame side of a window reaches a temperature as high as 1400° C., the temperature on the outer surface of the opposite glass pane may be as low as 300°–500° F. (150°–260° C.)

To test the effectiveness of the invention, several transparent aqueous sols were formulated and mixed. Spaced, double-pane windows were prepared by sealing together two 12"×12" (30×30cm) standard ⅛" (0.31 cm) glass window panes as shown in FIG. 2. Each window was filled with a separate sol mixture, and the window was installed in a simulated fire wall in a test facility. The facility was provided with means to create a simulated fire on one side of the wall.

The inside surface to window 12 was thus gradually raised during a period of one hour to a measured temperature in excess of 1000° C. During this time, the temperature on the outside face of the opposite glass pane, that is, the side not exposed to the simulated flame, was monitored. This temperature reached maximum values in the range of 300°–500° F. (150°–260° C.).

Following the test, the facility was cooled down and the test windows removed for examination. It was observed that glass on the inside pane had started to soften and flow. This indicated that the glass had been exposed to a temperature in the vicinity of 1400° C.

TABLE I sets forth, in parts by weight, several different sol compositions employed in filling the test windows. It also sets forth relevant data observed during the test. Appearance indicates the extent to which foaming occurred within the windows.

The materials employed in compounding the sol mixtures included an 85% by weight of a phosphoric acid solution ($H_3PO_4$), aluminum chlorohydrate [$Al_2Cl(OH)_5$], a 3% aqueous solution of polyvinyl alcohol (PVA), a melamine resin monomer (MEL), a polysulfonic acid catalyst (PSAC), and a 20% solution of sodium polystyrene (NaPS), and water.

TABLE I

| Example | 1 | 2 | 3 | 4 | 5 |
|---|---|---|---|---|---|
| $H_3PO_4$ | 560.0 | 560.0 | 560.0 | 560.0 | 560.0 |
| $Al_2Cl(OH)_5$ | 625.0 | 625.0 | 625.0 | 625.0 | 625.0 |
| $NaBO_2$—XHOH | | | | | |
| 3% PVA | 71.0 | 71.0 | 356.0 | 356.0 | 71.0 |
| MEL | | | 47.4 | 47.4 | |
| PSAC | 7.7 | 19.6 | 11.9 | 19.5 | |
| NaPS 20% | | | | | |
| HOH | | | | | |
| Appearance | strong foaming | strong foaming | foam 6" up from bottom | no foam | strong foaming |

| Example | 6 | 7 | 8 | 9 | 10 |
|---|---|---|---|---|---|
| $H_3PO_4$ | 560.0 | 560.0 | 560.0 | 560.0 | 560.0 |
| $Al_2Cl(OH)_5$ | 625.0 | 625.0 | 625.0 | 625.0 | 625.0 |
| $NaBO_2$—XHOH | | 30.1 | | | |
| 3% PVA | 71.0 | | | | 356.0 |
| MEL | | | | | 47.4 |
| PSAC | 19.5 | | 8.0 | | 11.9 |
| NaPS 20% | | | 47.4 | | |
| HOH | | | | 14.2 | |
| Appearance | foam 5" from bottom | good foam coating | foam 6" up from bottom | thin foam coating | no foam loose, soft, carbon char. |

A further set of windows was prepared for testing in the same facility. These windows were prepared by sealing together 4"×4" (10×10 cm) panes of standard window glass with half inch (1.2 cm) spacing. The windows were filled with different aqueous sols and mounted in the fire wall for testing.

TABLE II sets forth the compositions of the sols employed, together with the conditions observed during and after testing.

TABLE II

| Example | 11 | 12 | 13 | 14 | 15 |
|---|---|---|---|---|---|
| $H_3PO_4$ | 224 | 224 | 224 | 224 | 224 |
| $Al_2Cl(OH)_5$ | 250 | 250 | 250 | 250 | 250 |
| $LiNO_3$ | | | | | |
| $CH_3COOH$ | | | | | |
| Max Temp. (°F.) | 341 | 560 | 393 | 391 | 499 |
| Max. Ht. Foam (cm) | 3 | 4 | 4.5 | 4.5 | 4.5 |
| Glass Foam Bond | cold face | cold face | cold face | both surfaces | both surfaces |
| Foam Texture | hard | hard | hard | hard | hard |

| Example | 16 | 17 | 18 | 19 | 20 |
|---|---|---|---|---|---|
| $H_3PO_4$ | 224 | 224 | 224 | 224 | 224 |
| $Al_2Cl(OH)_5$ | 250 | 250 | 250 | 250 | 250 |
| $LiNO_3$ | | | 1 | 1 | 1 |
| $CH_3COOH$ | | | 1 | 2 | 2 |
| Max Temp. (°F.) | 328 | 500 | 380 | 433 | 326 |
| Max. Ht. Foam (cm) | 4 | 3.5 | 5 | 7.5 | 5 |
| Glass Foam Bond | both surfaces | both surfaces | cold face | cold face | cold face |
| Foam Texture | foam & gel | foam & gel | hard | hard | hard |

A portion of each sol identified in TABLE I was placed on a borosilicate watch glass, covered, and heated to a temperature of 750° C. at a rate of 300° C./hour. A solid foam formed from each sol, and was analyzed by x-ray. TABLE III sets forth the characteristics observed in the foams, and the crystal phases observed by x-ray.

TABLE III

| Example | 1 | 2 | 3 | 4 | 5 |
|---|---|---|---|---|---|
| Color | Lt. Grey | Lt. Grey | Dk. Grey | Dk. Grey | Grey |
| Foam Value | Fair | Fair | Excellent | Excellent | Good |
| Foam-Glass-Bond | Excellent | Excellent | Excellent | Excellent | Excellent |
| Foam Texture | Hard | Hard | Soft | Soft | Very Hard |
| XRD | $Al(PO_3)_3$ | $Al(PO_3)_3$ | $Al(PO_3)_3$ | $Al(PO_3)_3$ | $Al(PO_3)_3$ |

| Example | 6 | 7 | 8 | 9 | 10 |
|---|---|---|---|---|---|
| Color | Grey | White | Dk. Grey | White | Grey |
| Foam Value | Fair | Excellent | Good | Good | Fair |
| Foam-Glass-Bond | Excellent | Excellent | Excellent | Excellent | Fair |
| Foam Texture | Medium | Hard | Hard | Hard | Soft |
| XRD | $Al(PO_3)_3$ | $AlPO_4$ | $Al(PO_3)_3$ | $Al(PO_3)_3$ | $AlPO_4$ |

I claim:

1. A multi-panel glazing unit comprising a transparent, fluid sol and at least two transparent sheets of glazing material spaced apart to enclose the fluid sol, the fluid sol comprising a polar solvent and at least two inorganic compounds that form a transparent sol with the solvent, the sol wetting the inner surfaces of the glazing sheets and being thermally convertible to a cellular, non-flammable, inorganic material that adheres to the inner surfaces of the glazing sheets and that insulates against heat transfer.

2. A glazing unit in accordance with claim 1 wherein a first inorganic compound is an aluminum compound and a second inorganic compound is reactive with the aluminum compound under thermal influence to form an aluminous crystalline material.

3. A glazing unit in accordance with claim 2 wherein the second compound is a phosphorus compound.

4. A glazing unit in accordance with claim 3 wherein the phosphorus compound is phosphoric acid.

5. A glazing unit in accordance with claim 1 wherein the polar solvent is water.

6. A glazing unit in accordance with claim 2 wherein the aluminum compound is aluminum chlorohydrate.

7. A glazing unit in accordance with claim 1 wherein the sol additionally contains a compound reactive with the sheets of glazing material.

8. A glazing unit in accordance with claim 7 wherein the reactive compound is a compound of lithium or boron.

9. A glazing unit in accordance with claim 1 wherein the transparent fluid sol additionally comprises an organic additive that increases the viscosity of the sol.

10. A glazing unit in accordance with claim 1 wherein the transparent fluid sol completely fills the enclosure formed by the sheets of glazing material.

11. A glazing unit in accordance with claim 1 wherein the glazing sheets are united by a peripheral sealing strip.

12. A glazing unit in accordance with claim 11 wherein the sealing strip has pressure release openings.

13. A glazing unit in accordance with claim 1 wherein the fluid sol is convertible to a cellular, aluminous, crystalline material.

14. A glazing unit in accordance with claim 1 wherein the spaced glazing sheets have a soda lime glass composition.

15. A glazing unit in accordance with claim 1 wherein the spaced glazing sheets have a borosilicate glass composition.

16. A glazing unit in accordance with claim 1 wherein the spaced glazing sheets are composed of a transparent, glass-ceramic material.

17. A glazing unit in accordance with claim 1 wherein the two transparent sheets of glazing material are spaced at least about one cm. apart.

18. A glazing unit in accordance with claim 1 wherein the two transparent sheets are sufficiently spaced apart to provide a temperature differential of at least about 1000° C. between the sheets when the fluid sol is thermally cellulated.

19. A multi-panel glazing unit comprising a transparent, fluid sol and at least two transparent sheets of glazing material spaced apart to enclose the fluid sol, the sol comprising a polar solvent and at least two inorganic compounds that form a transparent sol with the solvent, a first compound being an aluminum compound and the second being a compound that is reactive with the aluminum compound under thermal influence to form an aluminous crystalline material.

\* \* \* \* \*